April 12, 1927.
T. M. EYNON
1,624,659
LIQUID LEVEL INDICATOR
Filed Nov. 24, 1922
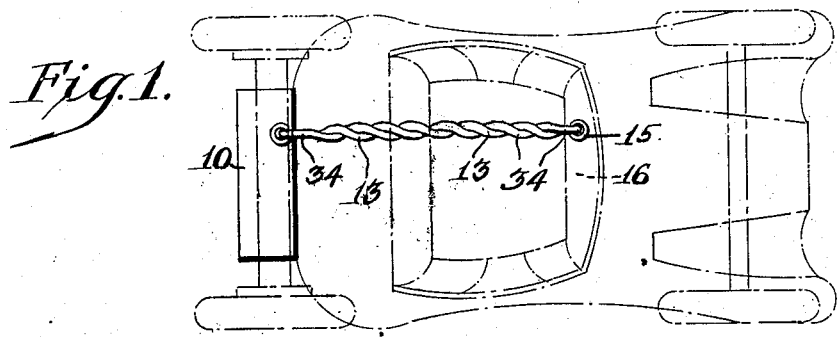
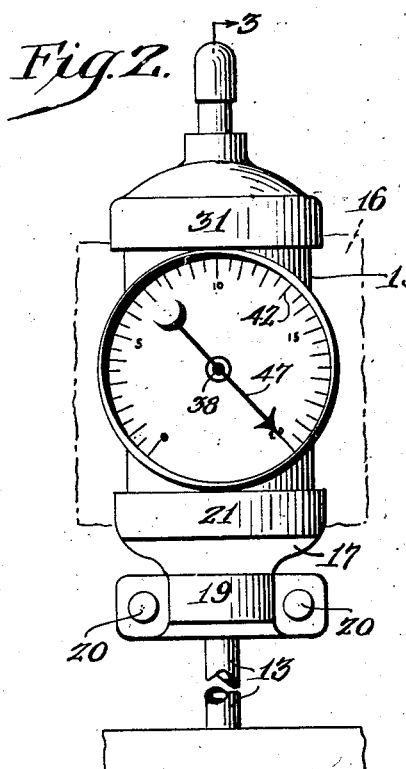
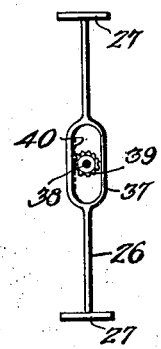
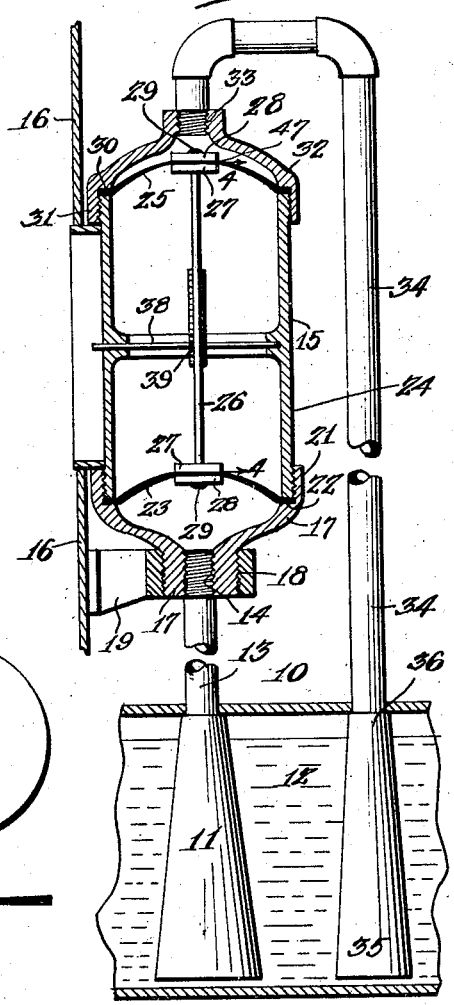
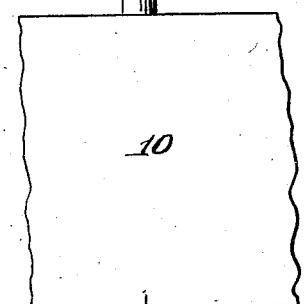
WITNESSES:
INVENTOR
Thomas M. Eynon.
BY
ATTORNEY Patented Apr. 12, 1927.

1,624,659

UNITED STATES PATENT OFFICE.

THOMAS M. EYNON, OF PHILADELPHIA, PENNSYLVANIA.

LIQUID-LEVEL INDICATOR.

Application filed November 24, 1922. Serial No. 602,992.

My invention relates to pressure gages intended for the indication of gasoline height at the dash-board.

The purpose of my invention is to free the indicating mechanism from barometric pressure differences and to connect with the gas and liquid spaces of the tank for operation of the mechanism so freed.

A further purpose of my invention is to place the indicating devices in an open compartment closed off from communication with the tank at both ends by balanced cupped diaphragms connected by a stem.

A further purpose is to equalize the temperature effect upon the outgoing and return pipes in an automobile indicator.

A further purpose is to provide a dial-operating plunger with diaphragms at opposite ends, sealing against air admission except to the space between the diaphragms and to operate the diaphragms in respect to fluid connections with the gasoline tank below and above the liquid level.

A further purpose is to operate a dial indicator by a gear upon its spindle connecting with a rack carried by the plunger of a diaphragm and preferably to steady the other end of the plunger by connection with a second diaphragm.

Further purposes will appear in the specification and in the claims.

I have preferred to illustrate my invention by one form only, selecting a form which is simple, and inexpensive and which at the same time well illustrates the principles of my invention.

Figure 1 is a top plan view showing an automobile in skeleton to which automobile my invention is applied.

Figure 2 is a side elevation of the indicator shown in Figure 1 with a portion of the tank and connections.

Figure 3 is a section of Figure 2 upon line 3—3.

The tank being arranged upon a different scale.

Figure 4 is a fragmentary section of Figure 3 taken upon line 4—4.

Figures 5 and 6 are top plan view and a central section respectively showing the diaphragms used.

In the drawings similar numerals indicate like parts.

In the tank 10 I show a tapered pipe terminal 11 extending practically to the bottom of the tank so that the depth of the gasoline 12 is effective as a head in forcing the air within the terminal upwardly to operate the indicator. I show the terminal 11 as tapered in order that the extent of movement for the same difference in depth may be greater at low heads than at high heads. The terminal 11 is connected by a pipe 13 with a threaded opening 14 in the base of an indicator 15 attached back of the dashboard 16. The opening 14 passes through the base 17 of the indicator and the outside of the base is threaded at 18 into a bracket 19 supported upon the dash-board by bolts 20. The upper end of the base forms a threaded flange 21 about a seat 22 for a diaphragm 23 preferably of leather impregnated with a leak proof material which is not affected by gasoline vapor.

The casing 24 is threaded into the flange 21 to compress the preferably cupped diaphragm about its circumference against the seat. The diaphragm is shown as thinner near the center than it is out toward the rim.

The diaphragm 23 is connected with a second diaphragm 25 of similar character by means of a stem 26 carrying a plate 27 at each end against which outside plates 28 are clamped by screws 29 passing through the diaphragms.

The diaphragm 25 is pressed against a seat 30 at its rim in the same manner as the diaphragm 23 is held against its seat 22, but by the upper end of the casing 24, which is threaded into flange 31 upon cap 32. The upper end of the cap is threaded at 33 for connection with a return pipe 34 extending down into the tank and either dipping below the surface of the tank by the terminal 35 of a smaller cross section than the terminal 11 to gain the advantage of the compression of a different volume of air or gas into the two pipes for corresponding heights of liquid in the tank.

The rod 26 is formed as a yoke at 37 to straddle the spindle shaft or rod 38 upon which the indicator 41 is carried.

One inner side of the yoke 37 carries a rack 39 which engages a gear 40 upon the shaft or rod so that the spindle is turned back and forth with reciprocal movement of the shaft and turns a needle 41 about the scale 42 mounted upon or in suitable position adjacent to the casing 24.

In operation increased height of the gasoline within the tank causes increase in height of the gasoline within the terminal 11 with a consequent lifting of the diaphragm 23 and of the associated diaphragm 25. The volume of the space above the diaphragm 25 is reduced to the same extent that the volume of the space below the diaphragm 23 is increased with the result that the total volume of combined air and liquid within the tank and connections remains unchanged.

In order to reduce to a minimum the effect of the temperature upon the air within pipes 13 and 34, I provide for twisting these pipes throughout any portion of their length where either would otherwise be subjected to a higher temperature than the other.

The device is automatically reset for zero every time that the gasoline falls below the level of the terminal 11.

It will be evident that my disclosure herein will suggest to others skilled in the art various ways for practicing my invention without copying the form shown and it is my purpose to include herein all such other structures as come within the reasonable spirit and scope of my invention.

Having thus described my invention, what I claim as new and desire to secure by Letters Patent is:—

1. In an indicator of gasoline height in tanks, a casing adapted to be connected at both ends with a tank, connections with the two ends terminating in pipes of different diameters adapted to extend within the gasoline, a pair of diaphragms in the casing, one at each end, shutting off the ends from the body of the casing a connection between the diaphragms, a spindle coupled with the connection within the casing to rotate with the movement of the diaphragms and an indicator carried by the spindle.

2. In an indicator for gasoline height in tanks, a casing, a pair of diaphragms in the casing, connections from the casing on the sides of the diaphragms farthest away from each other terminating in pipes of different diameter extending downwardly within the fluid spaces of the tank, a connection between the diaphragms, a rotary indicator and means for translating longitudinal movement of the connection into rotation of the indicator.

3. In an indicator for gasoline height in tanks, a casing having a body portion and ends separable therefrom, two diaphragms, one at each end and each clamped between the separable end and the body, connections with the two ends terminating in pipes of different diameters adapted to extend within the gasoline, mechanical connection between the diaphragms, a rack carried by the connection, a spindle supported in the body of the casing, a gear upon the spindle engaging the rack and an indicator upon the spindle.

4. In indicating means for gasoline height in tanks, a pair of diaphragms, a connection between said diaphragm, an indicating needle and connections for operating the needle therefrom, a tank and fluid connections from the ends of the diaphragms to the interior of the tank, one having larger diameter within the tank than the other.

5. In indicating means for gasoline height in tanks, a tank, a fluid-operated indicator adapted to be connected at both ends with the tank and connections from the indicator to the tank terminating in pipes extending downwardly within the tank and having different diameters therein.

6. In indicating mechanism for showing the height of gasoline in a tank, a tank, a pair of cupped diaphragms connected to operate together, a casing in which the diaphragms are mounted to give fluid access to the concave side of one diaphragm and the convex side of the other, fluid connections from these respective sides to the tank extended beneath the gasoline and having different diameters and indicator operating connections from the two diaphragms.

7. In an indicator for gasoline height in tanks, a tank, a pressure indicator at a distance from the tank, twisted fluid-operating connections from the indicator to the tank, entering the indicator at different points, a diaphragm between the points at which the connections enter the casing, indicating means and connections between the indicating means and the diaphragms for showing the differences in pressures between the connections.

8. In an indicator for gasoline height in tanks, a tank, a pressure indicator at a distance from the tank and fluid-operating connections from different parts of the indicator to the tank twisted to equalize the effects of temperature upon the connections.

THOMAS M. EYNON.